United States Patent [19]
Kitai et al.

[11] 4,304,475
[45] Dec. 8, 1981

[54] WARNING SYSTEM FOR AUTOMATIC FOCUSING CAMERA

[75] Inventors: Kiyoshi Kitai; Masuo Ogihara; Kozo Chimura; Nobuo Shinozaki, all of Yotsukaido, Japan

[73] Assignee: Seiko Koki Kabushiki Kaisha, Tokyo, Japan

[21] Appl. No.: 164,578

[22] Filed: Jun. 30, 1980

Related U.S. Application Data

[63] Continuation of Ser. No. 961,726, Nov. 17, 1978, abandoned.

[30] Foreign Application Priority Data

Nov. 18, 1977 [JP] Japan ................................. 52/138734

[51] Int. Cl.³ ..................... G03B 3/00; G03B 7/091; G03B 17/18
[52] U.S. Cl. ....................................... 354/25; 354/31; 354/60 R; 354/60 L; 354/198; 354/268
[58] Field of Search .................... 354/25, 60 R, 60 E, 354/60 L, 198, 268, 289, 31

[56] References Cited

U.S. PATENT DOCUMENTS

| | | | |
|---|---|---|---|
| 3,442,193 | 5/1969 | Pagel | 354/25 |
| 3,529,528 | 9/1970 | Leitz et al. | 354/60 E X |
| 3,605,590 | 9/1971 | Kitai | 354/60 L X |
| 3,938,169 | 2/1976 | Kitai | 354/268 |
| 3,947,858 | 3/1976 | Ishida | 354/268 X |

*Primary Examiner*—Michael L. Gellner
*Attorney, Agent, or Firm*—Robert E. Burns; Emmanuel J. Lobato; Bruce L. Adams

[57] ABSTRACT

A luminance detecting module and an focus detecting module are actuated in the first step of shutter release operation and an exposure control module is actuated in the second step. All of these modules are connected to a single electromagnet. When a photographing impractible signal is given in the first step of the shutter release operation, the electromagnet actuates a release locking member so that the shutter release motion is interrupted.

7 Claims, 4 Drawing Figures

WARNING SYSTEM FOR AUTOMATIC FOCUSING CAMERA

This is a continuation of application Ser. No. 961,726, filed Nov. 17, 1978 and now abandoned.

BACKGROUND OF THE INVENTION

This invention relates to a warning system for a camera having an electronic shutter which electrically controls the exposure and an automatic focusing device which electrically controls the focus of the photographing lense.

In cameras provided with an electronic shutter, a variety of methods which detect the brightness of the object to be photographed before the shutter release operation and actuate the warning device when the brightness is lower than a preselected level have been introduced. In automatic focusing systems, for instance, an automatic focusing system which controls the in-focus position by detecting the focus by means of photoelectric elements, it is necessary to give a warning as in the electronic shutter when automatic focusing is impracticable due to insufficient contrast between the brightness of the object and that of the background or because of insufficient brightness of the object itself.

A means to give the warning may be readily contrived by connecting warning means, such as lamps, to the luminance detecting unit and the in-focus detecting unit, respectively, so as to illuminate the lamps by the photographing impracticability signal given by those detecting units, however, this means has the disadvantages that the device is expensive and that the warning is liable to be missed to because the warning is given rather negatively; there is no positive warning to the camera user.

SUMMARY OF THE INVENTION

Accordingly, the object of the present invention is to provide a warning device which functions assuredly and is inexpensive.

According to the present invention, the objects are attained by a warning system composed of a brightness detecting module and an in-focus detecting module actuated in the first step of the shutter release operation, an exposure control module actuated in the second step simultaneously with the shutter release motion, and an armature which works to close the shutter controlled by an electromagnet and gives warning actuated by said brightness detecting module and/or said in-focus detecting module in the first step of the shutter release operation.

DESCRIPTION OF THE PREFERRED EMBODIMENTS

Figure 1:
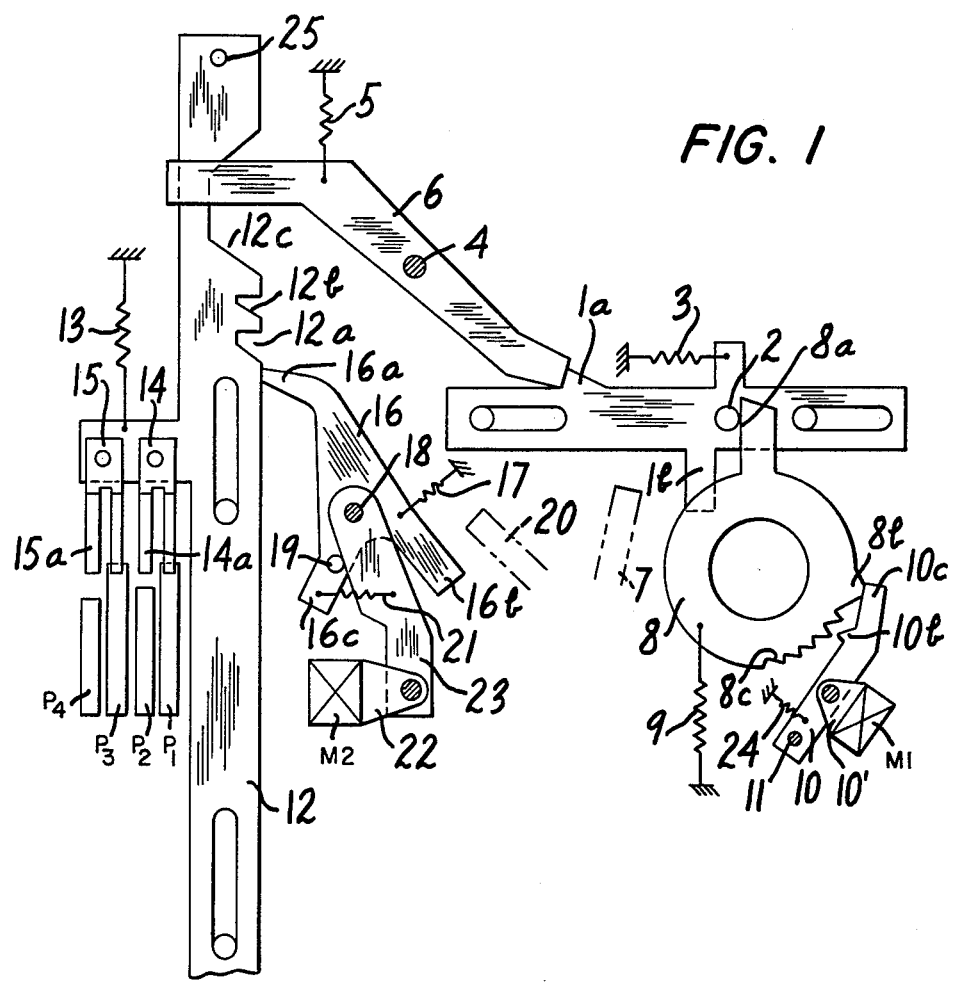
FIG. 1 is a plan view of a first embodiment of the warning system according to this invention.

Referring now to the drawings, explanation will be made of the embodiments hereinafter.

Figure 2:
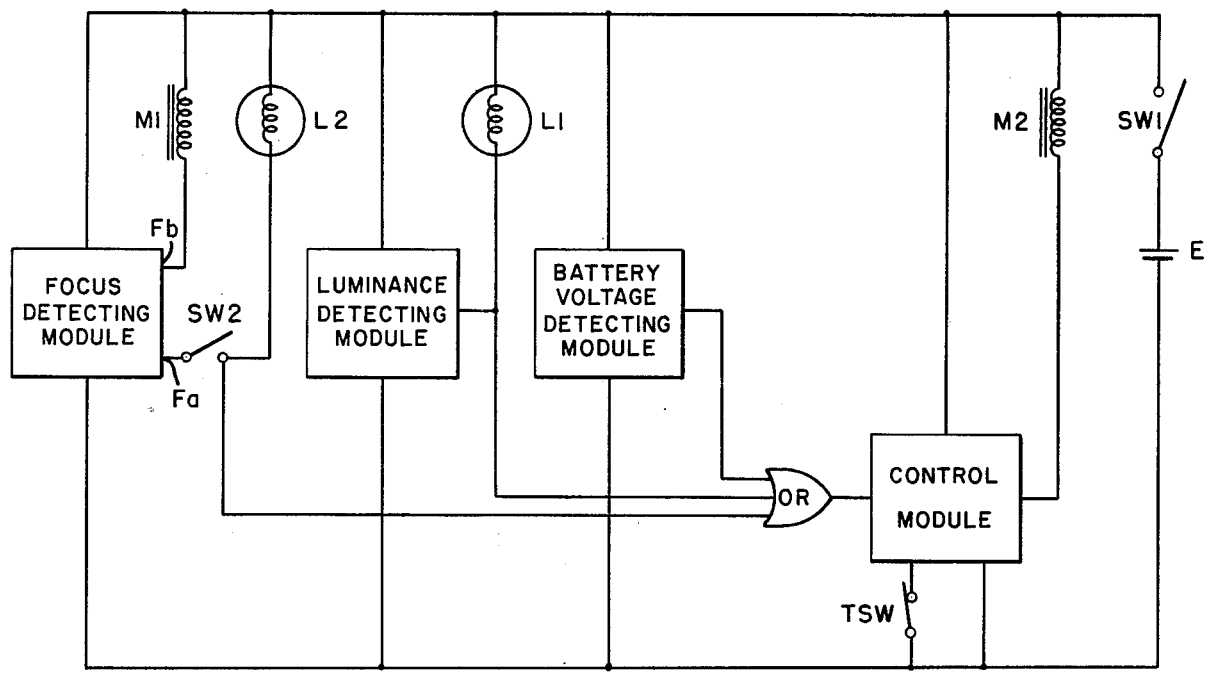
FIG. 2 is a circuit diagram of the electronic system for the first embodiment.

Referring to FIGS. 1 and 2, the first embodiment is composed of a timing member (1) slidable in the horizontal direction having a first projection (1a), a second projection (1b) to operate a shutter opening member (7) and a pin (2). The timing member is biased leftwards by a spring (3), and in the charged state as shown in FIG. 1, the first projection (1a) of the timing member (1) is engaged with a hook (6) rotatable about a pivot (4) and biased clockwise by a spring (5). An AF ring (8) to operate the photographing lense, not shown, having ratchet teeth (8c) and a projection (8b) adapted to engage with a first armature lever (10) which is controlled by an electromagnet (M1), and an arm (8a) which moves following the pin (2) is biased counterclockwise by a spring (9). The first armature lever (10) is rotatable about a pivot (11) and biased counterclockwise by a spring (24) and has a first armature (10') attracted by the first electromagnet (M1) and an pawl (10b) to be engaged with the ratchet teeth (8c) of the AF ring. In the charged state, the end (10c) of the first armature lever (10) rests on the projection (8b) of the AF; ring and the first armature (10') is depressed to the first electromagnet (M1).

A release plate (12) slidable in the vertical direction has at its upper end a pin (25) to operate the hook (6), at the middle portion a first contact piece (14) and a second contact piece (15) related to the electric circuit and on the right side, a first notch (12a), a second notch (12b) and a drop-in notch (12c) adapted to engage with a retaining lever (16). The retaining lever (16) has a first arm (16a) provided correlatively with the right side of the release plate (12), a second arm (16b) to operate a shutter closing member (20) and a third arm (16c) provided with a pin (19) and securing one end of a spring (21). The retaining lever is rotatable about a pivot (18) and biased counterclockwise by a spring (17). A second armature lever (23) having a second armature (22) which is controlled by a second electromagnet (M2) is rotatable about the pivot (18) and biased by the spring (21) so as to be fastened with the retaining lever (16). In the charged state, the retaining lever (16) is pressed clockwise by the release plate (12), the armature lever (23) is biased clockwise through the spring (21) so that the second armature (22) is pressed against the second electromagnet (M2).

Referring now to FIG. 2 explanation will be made on the electric circuit with which the warning system is used.

A focus detecting module (FM), luminance detecting module (LM), battery voltage detecting module (BM) and control module (CM) are connected in parallel to a battery (E) through a power switch (SW1) formed of the first contact piece (14) and fixed circuit patterns (P1 and P2).

An OR circuit (OR) and a second lamp (L2) is connected to the first terminal (Fa) of the focus detecting module (FM) through a second switch (SW2) formed of the second contact piece (15) and fixed circuit patterns (P3 and P4). The second terminal (Fb) of the focus detecting module (FM) is connected to the first electromagnet (M1). A first lamp (L1) and the OR circuit (OR) are connected to the output terminal of the luminance detecting module (LM). Th OR circuit (OR) is connected to the output terminal of the battery voltage detecting module (BM) while the output terminal of the OR circuit (OR) is connected to the control module (CM).

A timing switch (TSW), which is opened when the shutter is opened, is connected to the control module (CM), while the second electromagnet (M2) is connected to the output terminal of the control module (CM). Accordingly, the control module (CM) functions as a switching circuit which follows the OR circuit (OR) while the timing switch (TSW) is closed and it is changed over from a switching circuit to a time constant circuit when the timing switch (TSW) is opened.

In operation, as the release plate (12) is being pressed downwards, the first contact piece (14) moves downwards and the end portion (14a) comes in contact with the fixed circuit pattern (P2) so that the power switch (SW1) is closed. When the photographing object is bright enough and the voltage of the power source is sufficiently high, the luminance detecting module (LM) and the battery voltage detecting module (BM) give an output of high level so that the first lamp (L1) remains unlit, consequently, the OR circuit (OR) also gives an output of high level and the control module (CM) excites the second electromagnet (M2) to attract the second armature (22) so that the second armature lever (23) remains at rest. Therefore, the first arm (16a) of the retaining lever does not engage with the first notch (12a) of the release plate. As the release plate (12) is depressed further, the end portion (15a) of the second contact piece (15) on the release plate comes in contact with the fixed circuit pattern (P4) to close the switch (SW2). When the photographing condition is within the focus detection practicable range, for instance exposure measurement of over EV5 or photographing range of beyond 500 mm, the focus detecting module (FM) gives an output of high level and the second lamp (L2) is not lit; and as the OR circuit (OR) also gives an output of high level, the control module (CM) excites the second electromagnet (M2) so that the second armature (22) is attracted, and accordingly, the retaining lever is held so as the first arm (16a) does not to drop into the second notch (12b) of the release plate so that the release plate can be depressed successively.

During the successive depression of the release plate (12), when the drop-in notch (12c) reaches the position corresponding to the first arm (16a) of the retaining lever, the pin (25) on the release plate turns the pawl (6) counterclockwise to release the engagement of the pawl (6) from the first projection (1a) of the timing member (1), then, the timing member (1) starts moving leftwards pulled by the spring (3). At the same time, the AF ring (8) starts rotating counterclockwise pulled by the spring (9) following the pin (2). The first electromagnet (M1) is demagnetized to allow the first armature lever (10) to turn counterclockwise pulled by the spring (24) so that the pawl (10b) is engaged with the ratchet (8c) of the AF ring (8) to stop the AF ring (8) at the position when the AF ring (8) turned as far as the position corresponding to the value detected by the focus detecting module (FM). Thus the photographing lense, not shown, interlocked with the AF ring (8) is fixed at the position in focus.

As the timing member (1) moves leftwards further, the second projection (1b) turns the shutter opening member (7) counterclockwise to release the shutter. At the same time, the control module (CM) is changed over into the time constant circuit opening the timing switch (TSW). After a preselected time has passed, the second electromagnet (M2) is demagnetized to release the second armature (22), the retaining lever (16) turns counterclockwise pulled by the spring (17) and the second arm (16b) of the retaining lever turns the shutter closing member (20) clockwise to complete the exposure. When the release plate (12) is released from depression, it returns pulled by the spring (13) turning the retaining lever (16) clockwise with the drop-in notch (12c) during its return motion to the resting position shown in the drawing.

Now, explanation will be made on the performance of the system when the luminance of the photographing object is not sufficient.

During the depression of the release plate (12), the power switch (SW1) is closed and the luminance detecting module (LM) gives an output of low level due to insufficient brightness of the object so that the first lamp (L1) is lit. Accordingly, the OR circuit (OR) gives an ouput of low level, which cuts off the control module (CM) to demagnetize the second electromagnet (M2) so that the second armature (22) is released free to allow counterclockwise rotation of the retaining lever (16) pulled by the spring (17). Consequently, successive downward movement of the release plate (12) is interrupted by the engagement of the first arm (16a) with the first notch (12a) of the release plate. In this state, the timing member (1) will not start moving as the pin (25) is not engaged with the hook (6).

If the voltage of the power source is dropped off, the battery voltage detecting module (BM) functions simultaneously with the closing of the power switch (SW1) and turns off the control module (CM) to demagnetize the second electromagnet (M2) so that the movement of the release plate (12) is interrupted by the engagement of the first notch (12a) with the first arm (16a) of the retaining lever (16).

Explanation will be made on the performance of the system when the focus detection is impracticable although the object to be photographed is sufficiently bright.

In the initial stage of depression of the release plate (12), the luminance detecting module (LM) gives an output of high level as the brightness of the photographing object is sufficient, therefore, the second electromagnet is energized so that the movement of the release plate is not interrupted as the retaining lever (16) remains held at its resting position, however, when the switch (SW2) is closed according to the successive movement of the release plate, the focus detecting module (FM) gives an output of low level and the second lamp (L2) is lit up. Accordingly, the output of the OR circuit (OR) turns off the control module (CM) to demagnetize the second electromagnet (M2) and release the second armature (22) so that the retaining lever (16) turns counterclockwise pulled by the spring (17) so that the first arm (16a) of the retaining lever (16) is engaged with the second notch (12b) of the release plate (12) interrupting and preventing successive movement of the release plate (12).

As explained above, when the photographing object is not bright enough or the voltage of the power source is dropped off under the limit, the release motion is locked and at the same time a warning signal is given by lighting up the first lamp in the initial stage of the release operation. When the photographing object is bright enough while the focus detection is impracitcable, the release motion is locked and a warning is given by lighting up the second lamp in the second stage of the release operation. Accordingly, when those three factors are satisfied all together, the system performs normal shutter release operation to provide exposure.

According to this embodiment, the luminance detecting module and the focus detecting module are arranged so as to function in the first step and in the second step of the release motion, respectively, however, the luminance detecting module and the focus detecting module may be arranged to function in the reverse order.

Figure 3:
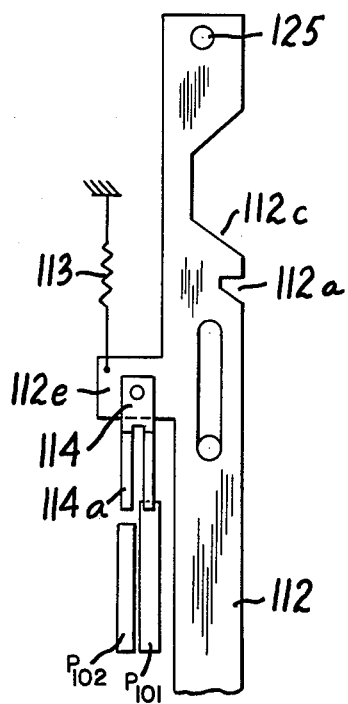
FIG. 3 is a plan view of a release member of a second embodiment.
Figure 4:
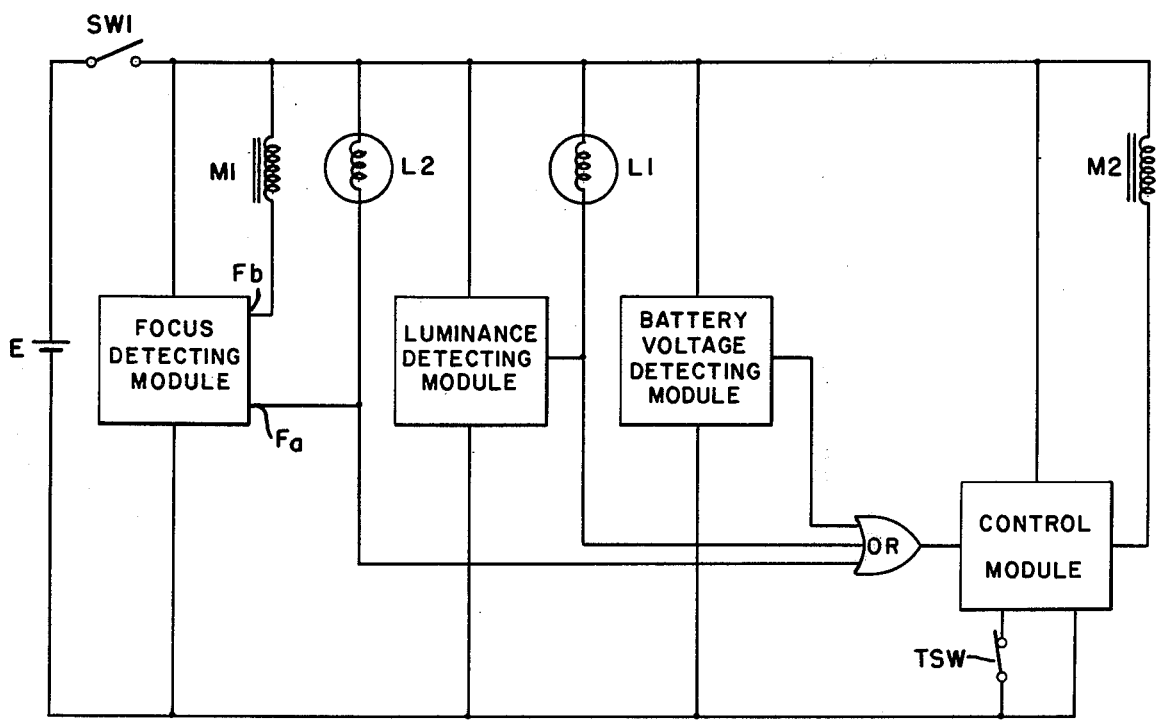
FIG. 4 is a circuit diagram of the electronic system for the second embodiment.

Referring to FIGS. 3 and 4, explanation will be made of the second embodiment according to this invention.

This second embodiment differs from the first embodiment in that the luminance detecting module and the focus detecting module are actuated at the same time when the power switch is closed, therefore, the release plate (112) is provided with only one notch (112a).

Referring to FIG. 3, a vertically movable release plate (112) is provided on its right side with a notch (112a) and a drop-in notch (112c), and on its arm (112e), there is hooked one end of a spring (113) which biases the release plate (112) upwards, and the arm (112e) carries a contact piece (114). Further explanation will be omitted as the construction of the system is identical with that of the first embodiment except the release plate (112).

Referring now to FIG. 4, a focus detecting module (FM), a luminance detecting module (LM), a battery voltage detecting module (BM) and a control module (CM) are connected to the power source (E) in parallel through a power switch (SW1) formed of the contact piece (114) and a fixed circuit pattern (P101 and P102). The first terminal (Fa) of the focus detecting module (FM) is connected to the OR circuit (OR) and a second lamp (L2). A first electromagnet (M1) is connected to the second terminal (Fb) of the focus detecting module (FM). The output terminal of the luminance detecting module (LM) is connected to a first lamp (L1) and the OR circuit (OR), and the output terminal of the battery voltage detecting module (BM) also is connected to the OR circuit (OR). The output terminal of the OR circuit (OR) is connected to the control module (CM). A timing switch (TSW) which is opened simultaneously with the shutter opening motion is connected to the control module (CM). A second electromagnet (M2) is connected to the output terminal of the control module (CM).

In operation, in the same manner as in the first embodiment, as the release plate (112) is depressed, the end (114a) of the contact piece (114) comes in contact with the fixed circuit pattern (P102) so that the power switch (SW1) is closed. Consequently, the focus detecting module (FM), the luminance detecting module (LM) and the battery voltage detecting module (BM) are actuated at the same time and when focus detection is practicable, when the photographing object is sufficiently bright and when the voltage of the battery is normal, those three modules develop respective high level output signals so that the first lamp (L1) and the second lamp (L2) connected to the respective modules are not lit. The output of those three modules actuate the OR circuit (OR) to give an output of high level so that the control module (CM) excites the second electromagnet (M2) to attract the second armature (22). Then, as in the first embodiment, the first arm (16a) of the retaining lever is not engaged with the notch (112a) of the release plate, therefore, successive depression of the release plate is allowed and when the drop-in notch (112c) is opposite the first arm (16a) of the retaining lever, the pin (125) of the release plate turns the hook (6) counterclockwise to release the timing member (1). The rest of the explanation will be omitted as the performance of the second embodiment is identical with that of the first embodiment.

When one of the three modules, the focus, the luminance and the battery voltage detecting module, gives a photographing impracticable signal, for instance focus detection is impracticable, the focus detecting module (FM) gives an output of low level and the second lamp (L2) is lit, but the first lamp (L1) is not lit as the luminance detecting module (LM) gives an output of high level. When one of the modules gives an output of low level, the OR circuit, connected to those three modules, gives an output of low level, consequently, the control module (CM) is turned off to demagnetize the second electromagnet (M2) so that the retaining lever (16) is released and turns counterclockwise pulled by the spring (17) and locks the release by interrupting and preventing further downward movement of the release plate by the engagement of the first arm (16a) of the retaining lever (16) with the notch (112a) of the release plate. According to the description, it will be obvious to those skilled in the art that the release motion is locked when the brightness of the photographing object is insufficient or the voltage of the battery is lower than a limit. And when the release motion is locked, it is impossible to judge from the stroke of the release lever which factor is the impracticality and caused the locking motion, however, it is possible to judge by looking at the lamp lit.

The second embodiment has an advantage that the stroke of the release plate is shorter as the release plate requires only one notch.

As explained above, the release motion is not locked and the normal operation of the system is allowed to complete the exposure only when the conditions of the three factors, the focus, the luminance and the battery voltage, are all satisfactory together, and if the condition of even one factor is not satisfactory, a warning is given by locking the release motion.

In the embodiments explained above, the warning is given by locking the release motion by means of the electromagnets and the retaining lever, however in a modification, the warning may be given in the range finder by means of a indicating plate interlocked with the retaining lever or the armature lever.

According to the present invention, as may be obvious from the description, it is economically advantageous that the electromagnet provided for the exposure operation can be used in common for giving a warning when the result of detection of the focus, luminance and/or the battery voltage is unsatisfactory, and at the same time, it is technically successful that the warning system is extremely reliable as the release operation can be interrupted when the warning is given by the engagement of the retaining lever actuated by the electromagnet with the release plate.

We claim:

1. In an automatic focusing camera having a luminance detecting module for detecting the brightness of a scene to be photographed and for developing an electrical output signal representative of the scene brightness, a focus detecting module for detecting the condition of focus of the camera and for developing an electrical output signal representative of the condition of focus, and a camera shutter operating mechanism for opening and closing a camera shutter, wherein said camera shutter operating mechanism includes a manually operable release member which travels a certain distance in operation to actuate said camera shutter operating mechanism to initiate exposure and a single electromagnet for controlling termination of exposure, the combination comprising: means normally operative for preventing said manually operable release member from traveling the certain distance and thereby preventing actuation of said camera shutter operating mechanism; and means comprising said electromagnet, responsive to both the output signal of said focusing module when a focused condition is detected and the output signal of said luminance module when adequate scene brightness is detected, for disenabling said means for preventing said manually operable release member from traveling thereby permitting said manually operable release member to travel and actuate said shutter operating mechanism only when the camera is focused and the scene brightness is adequate.

2. In an automatic focusing camera according to claim 1, said means for preventing said release member from traveling comprising: a first lever mounted for pivoting toward and away from said release member and including means for engaging and holding said release member; biasing means for biasing said first lever to pivot toward and engage said release member to hold said release member before it travels and actuates said camera shutter operating mechanism; and a second lever mounted for pivoting between a position blocking said first lever from pivoting and engaging said release member and a position clear of said first lever to permit said first lever to pivot and engage said release member.

3. In an automatic focusing camera according to claim 2: said electromagnet positioned for holding said second lever in a position blocking said first lever from pivoting when said electromagnet is energized for disenabling said means for preventing said manually operable release member from traveling.

4. In an automatic focusing camera according to claim 2, wherein said release member is an elongated element which travels in its length direction and having a longitudinal edge facing said first lever, said longitudinal edge having notches spaced lengthwise of said elongated release member, and said means for engaging and holding said release member comprising a lever arm end portion of said lever which engages a notch in said longitudinal edge of said elongated release member when said first lever pivots to hold said elongated release member.

5. In an automatic focusing camera according to claim 1: wherein said means for disenabling includes said electromagnet and a control module, responsive to both the output signal of said focusing module when a focused condition is detected and the output signal of said luminance module when adequate scene brightness is detected, for developing an electrical signal applied to said electromagnet to render said means for preventing said release member from traveling inoperative.

6. In an automatic focusing camera according to claim 1, 2 or 5: a power circuit for applying power to said focus detecting module and said luminance detecting module, wherein said power circuit includes first switch means cooperative with said release member for closing said power circuit and applying power to said focus detecting and luminance detecting modules upon initial travel of said release member; and second switch means cooperative with said release member for applying the output signal of said luminance detecting module to said means for disenabling after said first switch means has completed said power circuit.

7. In an automatic focusing camera according to claim 1, 2, 4, or 5, further comprising: indicating means responsive to the electrical output signals of said focus detecting and said luminance detecting modules for visually indicating when the camera is out of focus and for visually indicating when the scene brightness is insufficient.

* * * * *